US009360356B2

(12) United States Patent
Graf

(10) Patent No.: US 9,360,356 B2
(45) Date of Patent: Jun. 7, 2016

(54) MAGNETO INDUCTIVE FLOW MEASURING DEVICE HAVING A COIL CORE PROTRUDING OUT FROM THE COIL

(75) Inventor: Oliver Graf, Kanerkinden (CH)

(73) Assignee: ENDRESS + HAUSER FLOWTEC AG, Reinach (CH)

(*) Notice: Subject to any disclaimer, the term of this patent is extended or adjusted under 35 U.S.C. 154(b) by 26 days.

(21) Appl. No.: 14/347,004

(22) PCT Filed: Aug. 16, 2012

(86) PCT No.: PCT/EP2012/066040
§ 371 (c)(1), (2), (4) Date: Mar. 25, 2014

(87) PCT Pub. No.: WO2013/045171
PCT Pub. Date: Apr. 4, 2013

(65) Prior Publication Data

US 2014/0230565 A1 Aug. 21, 2014

(30) Foreign Application Priority Data

Sep. 27, 2011 (DE) ........................ 10 2011 083 549

(51) Int. Cl.
*G01F 1/58* (2006.01)
*G01F 1/60* (2006.01)

(52) U.S. Cl.
CPC ................ *G01F 1/586* (2013.01); *G01F 1/588* (2013.01); *G01F 1/60* (2013.01)

(58) Field of Classification Search
None
See application file for complete search history.

(56) References Cited

U.S. PATENT DOCUMENTS

| | | | | |
|---|---|---|---|---|
| 2,741,121 | A | 4/1956 | Raynsford | |
| 3,191,436 | A | 6/1965 | Davis | |
| 4,899,592 | A | 2/1990 | Behrens | |
| 4,932,268 | A | 6/1990 | Hafner | |
| 5,540,103 | A | 7/1996 | Zingg | |
| 2006/0225493 | A1* | 10/2006 | Dannhauer | G01L 19/0618 73/146 |
| 2014/0230564 | A1* | 8/2014 | Graf | G01F 1/588 73/861.11 |
| 2014/0230565 | A1* | 8/2014 | Graf | G01F 1/586 73/861.11 |

FOREIGN PATENT DOCUMENTS

| | | | |
|---|---|---|---|
| DE | 1772087 | | 8/1958 |
| DE | 10322082 | A1 | 12/2004 |
| EP | 0309932 | A1 | 4/1989 |
| EP | 0649005 | A1 | 4/1995 |
| EP | 1674836 | A1 | 6/2006 |
| GB | 1341038 | | 12/1973 |
| WO | 2013045171 | A1 | 4/2013 |

OTHER PUBLICATIONS

May 18, 2012 German Search Report, German Patent Office, Munich.
Dec. 7, 2012 International Search Report, EPO, The Netherlands.
Apr. 10, 2014 English Translation of IPR, WIPO, Geneva, Switzerland.

* cited by examiner

*Primary Examiner* — Harshad R Patel
(74) *Attorney, Agent, or Firm* — Bacon & Thomas, PLLC

(57) ABSTRACT

A magneto inductive flow measuring device comprising a measuring tube and coil systems arranged thereon, wherein each coil system includes a coil and a coil core so led through the coil that the coil core protrudes from the coil, wherein two coil systems are so arranged on the measuring tube on a line parallel to a longitudinal axis of the measuring tube that a pole shoe is arranged between the measuring tube and the coil cores protruding from the coil systems.

10 Claims, 10 Drawing Sheets

MAGNETO INDUCTIVE FLOW MEASURING DEVICE HAVING A COIL CORE PROTRUDING OUT FROM THE COIL

TECHNICAL FIELD

The present invention relates to a magneto inductive flow measuring device including a measuring tube and coil systems arranged thereon, wherein each coil system includes a coil and a coil core so led through the coil that the coil core protrudes out from the coil.

BACKGROUND DISCUSSION

Magneto inductive flow measuring devices utilize the principle of electrodynamic induction for volumetric flow measurement and are disclosed in a large number of publications. Charge carriers of the medium moved perpendicularly to a magnetic field induce a measurement voltage in measuring electrodes arranged essentially perpendicularly to the flow direction of the medium and perpendicularly to the direction of the magnetic field. The measurement voltage induced in the measuring electrodes is proportional to the flow velocity of the medium averaged over the cross section of the measuring tube, thus proportional to the volume flow rate. If the density of the medium is known, the mass flow in the pipeline, respectively in the measuring tube, can be determined. The measurement voltage is usually tapped via a measuring electrode pair, which is arranged in the region of maximum magnetic field strength relative to the coordinate along the measuring tube axis and where, thus, the maximum measurement voltage is to be expected. The electrodes are usually galvanically coupled with the medium; known, however, also, are magneto inductive flow measuring devices with contactless, capacitively coupling electrodes.

The measuring tube can be manufactured, in such case, either of an electrically conductive, non-magnetic material, e.g. stainless steel, or of an electrically insulating material. If the measuring tube is manufactured of an electrically conductive material, then it must be lined in the region coming in contact with the medium with a liner of an electrically insulating material. The liner is composed, depending on temperature and medium, for example, of a thermoplastic, thermosetting or elastomeric, synthetic material. Known, however, are also magneto inductive flow measuring devices equipped with a ceramic lining.

An electrode can be subdivided essentially into an electrode head, which comes at least partially in contact with a medium, which flows through the measuring tube, and an electrode shaft, which is encapsulated almost completely in the wall of the measuring tube.

Besides the magnet system, the electrodes are the central components of a magneto inductive, flow measuring device. In the embodiment and arrangement of the electrodes, it is to be heeded that they can be mounted as simply as possible into the measuring tube and that subsequently in measurement operation no sealing problems occur; moreover, the electrodes should provide a sensitive and simultaneously low-disturbance registering of the measurement signal.

Besides the measuring electrodes serving for tapping a measurement signal, often additional electrodes in the form of reference, or grounding, electrodes are installed in the measuring tube, which serve to measure an electrical, reference potential or to detect partially filled measuring tubes or to register the temperature of the medium by means of an installed temperature sensor.

SUMMARY OF THE INVENTION

An object of the invention is to provide a simple and cost effectively manufactured, magneto inductive, flow measuring device.

The object is achieved by a magneto inductive flow measuring device, comprising: a measuring tube; and coil systems arranged thereon, wherein: each coil system includes a coil and a coil core so led through said coil that said coil core protrudes from said coil; said coil systems are so arranged on said measuring tube on a line parallel to a longitudinal axis of said measuring tube that a pole shoe is arranged between said measuring tube and said coil cores protruding from said coil systems.

BRIEF DESCRIPTION OF THE DRAWINGS

The invention permits numerous forms of embodiment. Some thereof will now be explained in greater detail based on the appended figures of the drawing. Equal elements are provided in the figures with equal reference characters. The figures of the drawing show as follows.

DETAILED DISCUSSION IN CONJUNCTION WITH THE DRAWINGS

Figure 1:
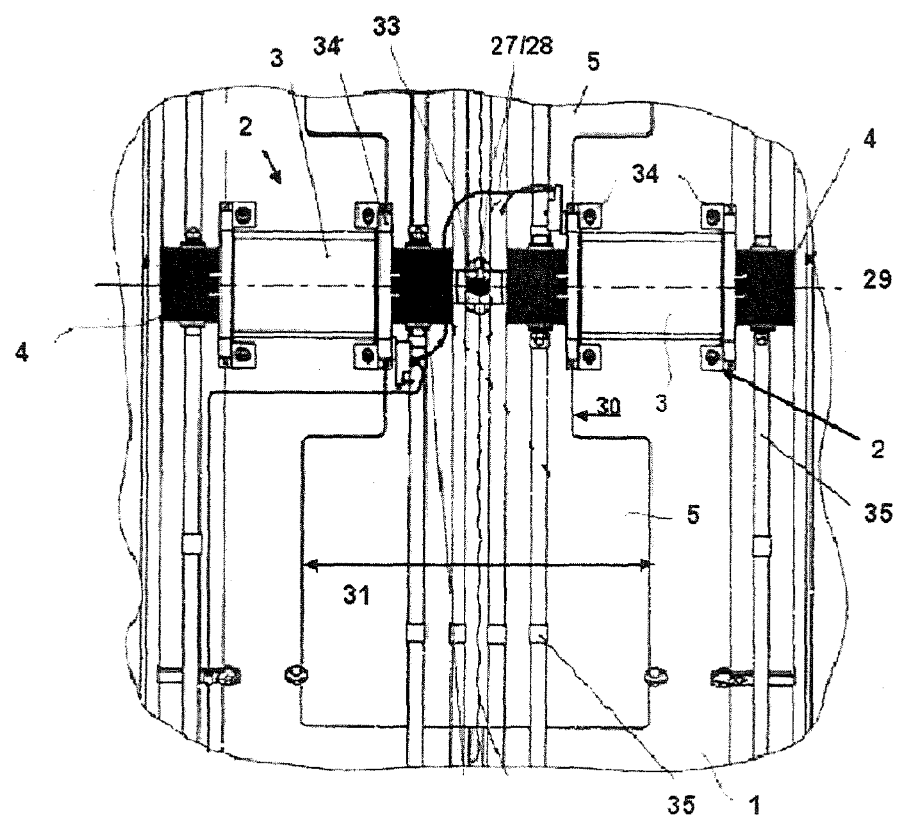
FIG. 1 is a magneto inductive, flow measuring device of the invention in plan view.

FIG. 1 shows, in plan view, a magneto inductive, flow measuring device of the invention having a measuring tube 1 and coil systems 2 arranged thereon. Each coil system 2 includes a coil 3 and a coil core 4 led through the coil 3. In a further development, the coil core 4 protrudes from at least one end 11 of the coil 3. In this example of an embodiment, the coil core 4, which here includes a number of core sheets, protrudes symmetrically from both end faces 11 and 12 of the coil 3. The core sheets are L shaped and so oriented relative to one another that in a longitudinal section through the coil system, the coil core appears U shaped.

Two coil systems 2 are so arranged, in such case, in a line 29 parallel to a longitudinal axis of the measuring tube on the measuring tube 1 that a pole shoe 5 is arranged between the measuring tube 1 and the coil cores 4 protruding out from the coil systems 2.

The coils 3 comprise, for example, a copper wire wound helically on a hollow cylindrical coil body of a polymer. The two coil systems have the same longitudinal axis 29, which extends especially parallel to a longitudinal axis of the measuring tube.

In a further development of the invention, the coil cores 4 contact the pole shoe 5. As evident from FIG. 4 in combination with FIG. 5, coil core 4 is U shaped and so arranged on the measuring tube 1 and oriented relative to the measuring tube 1 that the opening of the U points toward the measuring tube 1 and, therewith, toward the pole shoe 5.

A further development of the invention provides that the coil cores 4 of the coil systems 2 comprise, in each case, at least two, especially at least three core sheets 6, 7 and 8, especially at least two, especially three stacks, in each case, of a plurality of core sheets 6, 7 and 8, which are led through the coil 3. All core sheets 6, 7 and 8 are embodied identically and have, thus, especially, equal shape and size.

Figure 7:
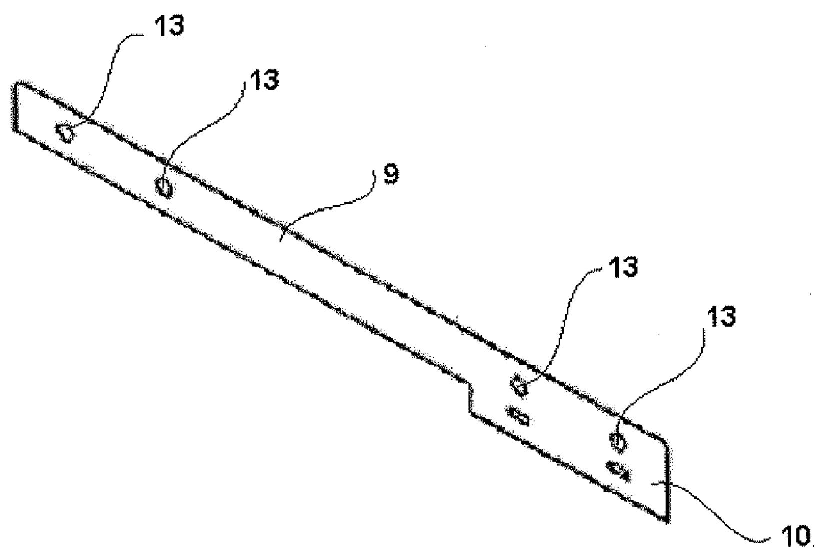
FIG. 7 shows perspectively, a core sheet of the invention.

As already mentioned, and as evident from the illustration in FIG. 7 showing a first core sheet 6, the core sheets 6 are, according to a form of embodiment of the invention, L shaped. Each core sheet 6 has, thus, a first leg 9 and a second leg 10, which are connected with one another to form an L shape. In a further development of the invention, all core sheets 6, 7 and 8 are embodied identically and have, thus, in each case, equal shape and size. The first and second legs 9 and 10 form, for example, an angle of 90°. The same is true, naturally, also for the second core sheet 7, the third core sheet 8 and any other core sheet.

Further developed, each core sheet 6 has bores 13, by which they are bolted with one another. The bores 13 are arranged symmetrically with reference to the length of the first leg 9 of the core sheet 6, so that in the case of an oppositely oriented core sheet, whose first leg is flush with the first leg 9 of the core sheet 6, the two first legs are, thus, coincident, the bores coincide, so that the two core sheets can be bolted together. Core sheet 6 has rounded corners, for example, with radii of size R0.5 to R10, depending on the size of the core sheet. Not rounded, however, are the two corners of the free end of the second leg 10, which end contacts a pole shoe in the assembled state of the coil system.

If clamping bands are used for affixing the coil system on the measuring tube, each core sheet can, such as here, have other bores, here with rectangular cross section, through which the clamping bands are led for connecting the coil system securely with the measuring tube.

A core sheet of the invention comprises especially a metal having a magnetic relative permeability μr of at least 50, especially at least 1000 to 50,000. It is formed, for example, of M165 or M330 steel.

In the case of a variant, in order to implement the above referenced U shape of the coil core 4, at least a first core sheet 6 and a second core sheet 7 are so led through the coil that the first leg 9 of the first core sheet 6 and the first leg 9 of the second core sheet 7 extend parallel to one another and that the second leg 10 of the first core sheet 6 and the second leg 10 of the second core sheet 7 extend parallel to one another, wherein the second leg 10 of the first core sheet 6 and the second leg 10 of the second core sheet 7 are arranged at different ends of the coil 3.

Figure 4:
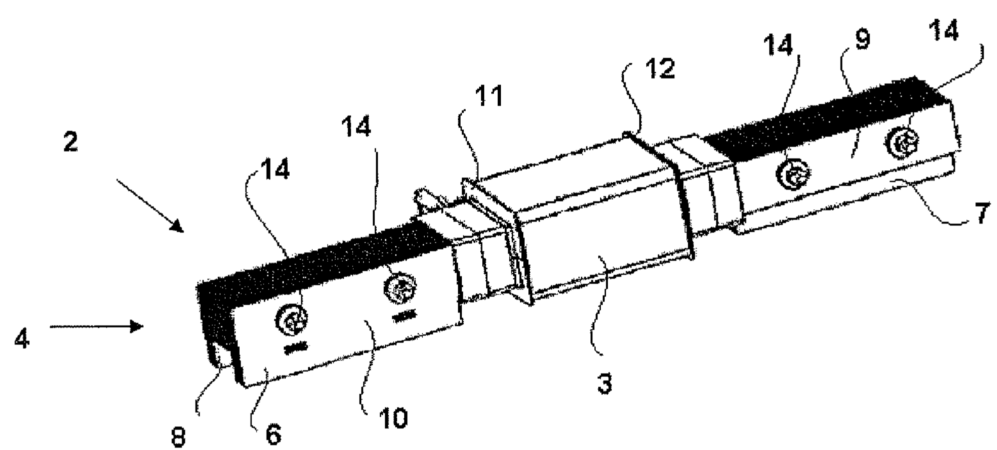
FIG. 4 shows perspectively, a coil system of the invention for a magneto inductive, flow measuring device of the invention.
Figure 5:
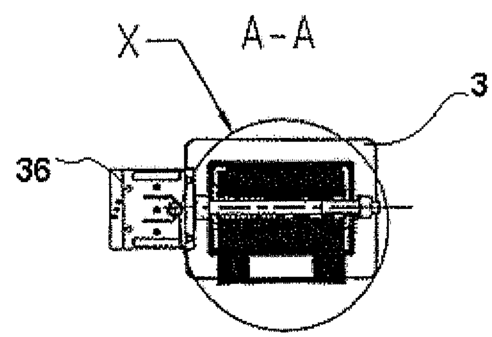
FIG. 5 shows the coil system of FIG. 4 in cross section.
Figure 5:
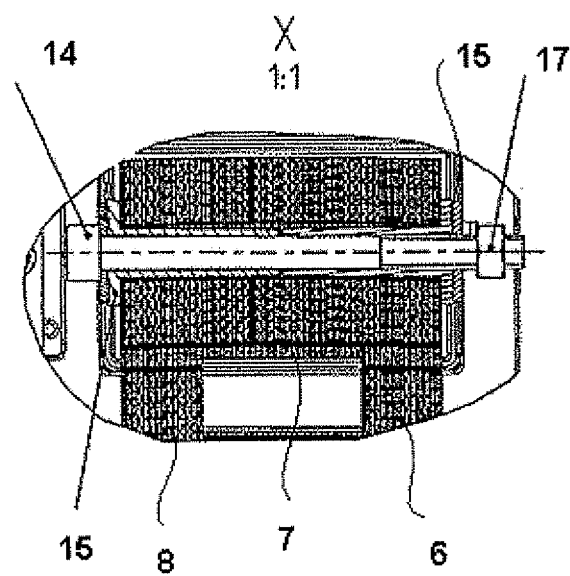

FIG. 4 and FIG. 5 illustrate the construction of a coil system of the invention. Arranged between coil 3 and the second legs 10 of the core sheets 6, 7 and 8 can be electrically insulating spacers 16. These are especially rings of synthetic material, for example, a glass fiber reinforced thermoplastic such as e.g. polyamide PA66. Spacers (not shown) are applied, in order to establish the separation of the coil 3 from the second legs 10 of the core sheets 6, 7 and 8 and, in given cases, in order to position and to secure the coil 3 centrally between the second legs 10 of the core sheets 6, 7 and 8. Thus, an option is to use different core sheets with especially different lengths of their first legs with, in each case, a coil of equal construction. Therewith, it is possible to build with many same parts of respectively different size coil systems for differently large magneto inductive, flow measuring devices, especially for differently large nominal diameters of the measuring tubes of the magneto inductive, flow measuring devices. The measuring tube of a magneto inductive, flow measuring device of the invention has especially a size between DN700 and DN2400, especially between DN1350 and DN2400. With identical components, thus coil systems, for example, for nominal diameters of DN700 to DN1200 and DN1350 to DN2400 can be manufactured.

A magnetically insulating material has a magnetic relative permeability μr of less 1, especially near 0. Electrically insulating materials have a resistivity greater than $1*10^{-10}$ $\Omega mm^2/m$, especially greater than $1*10^{-15}$ $\Omega mm^2/m$. These data are for standard conditions.

Alternatively thereto, that not only the bores but also the first legs 9 of the core sheets 6, 7 and 8 coincide with one another, in another embodiment, the first leg 9 of the first core sheet 6 and the first leg 9 of the second core sheet 7 are arranged axially offset from one another. In this way, a length of the coil system parallel to the first legs 9 of the core sheets 6 and 7 is greater than a length of the first legs 9 of the core sheets 6 and 7. Their ends are then not flush with one another. The first legs 9 are not coincident. The bores, especially at least two, in the core sheets do, however, coincide, since these are arranged in the core sheets corresponding to the axial offset of the core sheets from one another. Such a coil system is not developed in the figures. Analogously, in the case of core sheets led through the coil in stacks, the first legs 9 of the first core sheets 6 and the first legs 9 of the second core sheets 7 are arranged axially offset relative to one another. Also therewith, differently large coil systems can be implemented.

Through the previously introduced bores 13 in the core sheets 6, 7 and 8, the core sheets 6, 7 and 8 are bolted together by means of bolts 14. The bores 13 are so arranged in the core sheets 6, 7 and 8 that, in the assembled state of the coil system 2, the bores 13 of the first core sheet 6 coincide with the bores 13 of the second core sheet 7, so that the first and second core sheets 6 and 7 can be bolted together through the bores 13. Analogously, then also the third core sheet 8 is boltable, since it coincides with the first core sheet. This is achieved through the symmetry of the bores 13 with reference to the length of the first leg 9 of each core sheet 6, 7 and 8.

In the sketched variant, each core sheet 6, 7 and 8 has a first leg 9 and a second leg 10, which are connected with one another to form an L shape, wherein at least a first core sheet 6 and a second core sheet 7 and a third core sheet 8 are so led through the coil 3 that the first leg 9 of the first core sheet 6 and the first leg 9 of the second core sheet 7 and the first leg 9 of the third core sheet 8 extend parallel to one another through the coil 3 and that the second leg 10 of the first core sheet 6 and the second leg 10 of the second core sheet 7 and the second leg 10 of the third core sheet 8 extend parallel to one another, wherein the second leg 10 of the first core sheet 6 and the second leg 10 of the third core sheet 8 are arranged at a first end 11 of the coil 3 and the second leg 10 of the second core sheet 7 is arranged at a second end 12 of the coil 3 facing away from the first end 11, wherein the first legs 9 of the core sheets 6, 7 and 8 and the second legs 10 of the first and a third core sheet 6 and 8 and the second leg 10 of the second core sheet 7 form a U shaped coil core, wherein the second core sheet 7 is arranged between the first core sheet 6 and the third core sheet 8 and is led especially centrally through the coil 3 and wherein the pole shoe 5 is arranged between the measuring tube 1 and at least the second legs 10 of the first and third core sheets 6 and 8.

Coil core 4 is divided virtually in three parts. If the core sheets 6, 7 and 8 are, in each case, flushly parallel to the longitudinal axis 29 of the coil system 2, respectively here also parallel to the longitudinal axis 22 of the measuring tube 1, then the pole shoe 5 lies also between the measuring tube 1 and the first legs 9 of the second core sheets 7. If the pole shoe 5 is contacted, however, only by the second legs 10 of the first and third core sheets 6 and 8.

The core sheets 6, 7 and 8 are led through the opening of the coil 3 in such a number of mutually contacting sheets that at least the width of the opening, especially the whole opening, is filled. The structural embodiment, especially of the first leg 9, of the core sheets 6, 7 and 8 depends, consequently, on the structural shape of the coil 3 and, conversely. The number of core sheets 6, 7 and 8 led through the coil 3 is likewise dependent thereon.

The bolts 14 are, in such case, in a form of embodiment, electrically and/or magnetically insulated from the core sheets 6, 7 and 8 by means of bolt sleeves 15.

In the illustrated example, two bolt sleeves 15 arranged opposite one another are so prestressed relative to one another by means of the bolted connection, here formed of bolt and nut 17, that at least one bolt sleeve 15 shortens axially by a predetermined measure, such that it at least partially assumes the shape of a bellows. For purposes of insulation, the bolt sleeves 15 prevent the core sheets 6, 7 and 8 from contacting the bolts 14. In order to accommodate tolerances, for example, in the thicknesses of the core sheet stacks, the bolt sleeves 15 are, in such case, so embodied that the sum of their lengths in the unassembled state, which lie in the assembled state in the core sheet stacks, exceeds the thickness of the core sheet stack by a predetermined amount. The predetermined amount is, in such case, less than the greatest possible axial compression of the bolt sleeves 15, without that these are deformed beyond the parameters of the invention.

In the assembling, the bolt sleeves 15 are inserted from both sides into the core sheet stacks. Their annular tips contact, in such case. If now a bolt 14 is inserted through the bolt sleeves 15 and the nut tightened, the bolt head introduces an axially acting force into the bolt sleeves 15, which leads to the fact that at least one of the bolt sleeves 15 is deformed according to the invention, until the bolt head comes to rest and the sum of the lengths of the bolt sleeves 15 in the core sheet stack corresponds to the thickness of the core sheet stacks.

FIG. 1 shows that the pole shoe 5 has a first width 30 parallel to the longitudinal axis of the measuring tube 1, which is less than or equal to a separation of the two coils 3 from one another. Pole shoe 5 is, in such case, so arranged on the measuring tube 1 and oriented relative to the coils 3 that the first width 30 is located in the region of the coils 3 of the two coil systems 2. The two coils 3 are so opposed that the pole shoe 5 lies between them, especially between their two opposing end faces 11. The separation of the two coils 3 is measured, thus, between the two oppositely lying end faces 11 of the coils. Additionally, the pole shoe 5 has a second width 31 parallel to the longitudinal axis of the measuring tube 1, which is greater than the separation of the two oppositely lying end faces 11 of the coils 3. In general, the pole shoe 5 extends, at least partially, around the measuring tube 1.

The region of the lesser first width 30 of the pole shoe 5 extends, in such case, across the width of the coil core 4, especially across the entire width of the coils 3, perpendicular to the longitudinal axis 29 of the coil systems 2, which lie on the line of their longitudinal axes 29. In the shown example of an embodiment, the region of the lesser first width 30 of the pole shoe 5 is as long as the width of the coil systems 2.

Figure 6:
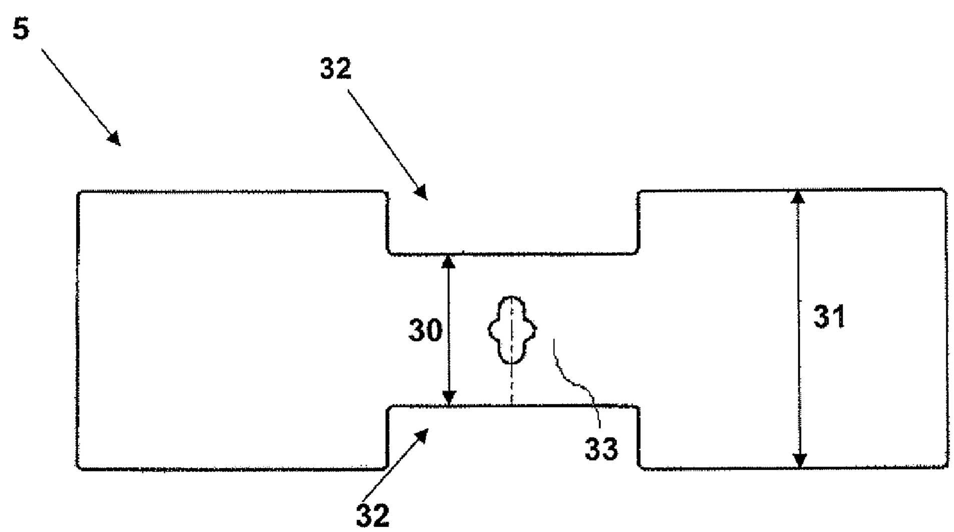
FIG. 6 shows a pole shoe of a coil system of the invention in plan view.

The pole shoe 5 of the invention, as shown in FIG. 6, has, thus, a length and a second width 31. Pole shoe 5 has the shape of a simply curved shell. In plan view, thus projected on the plane of the drawing, pole shoe 5 has, apart from the rounded corners and the cutouts 32, virtually a rectangular appearance. The cutouts 32 are arranged symmetrically and result in the first width 30 in the region of the cutouts 32. Alternative embodiments provide other options. For example, another option has a double lobed appearance in plan view. Furthermore, pole shoe 5 includes a bore 33 for allowing the passage of an electrode, especially a measured material monitoring electrode or a reference electrode.

If, such as shown in FIG. 1, the magneto inductive, flow measuring device is projected into a plane, which extends parallel to the measuring tube axis and perpendicular to an additional plane, in which the measuring tube axis and the longitudinal axes 29 of the coils 3 lie, then, according to a form of embodiment of the invention, the coil cores 4 of the coils 3 overlap exclusively the pole shoe 5. As already mentioned above, the pole shoe is contacted by one or more coil systems 2, however, only by the second legs of the first and third core sheets, respectively the second legs of the core sheets of the first and third core sheet stacks.

Figure 8:
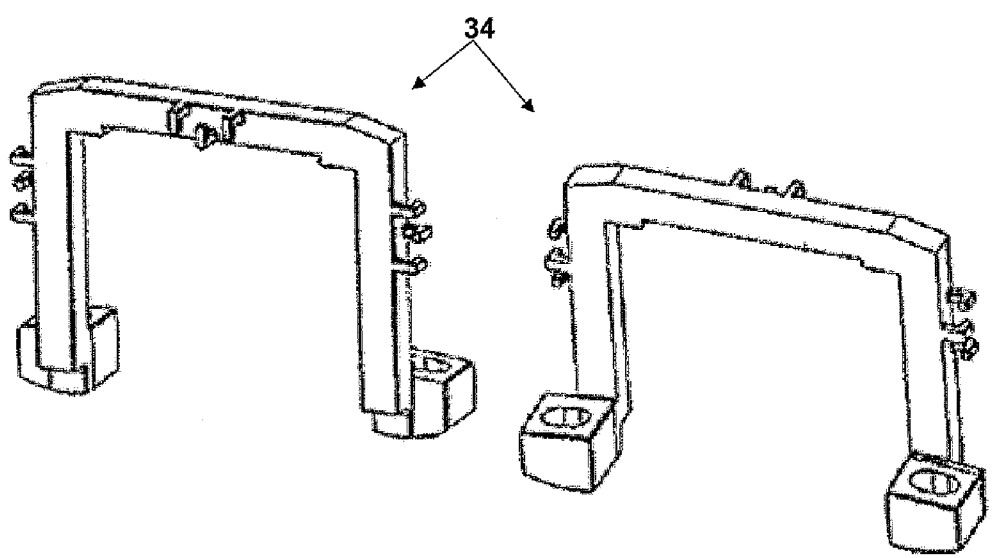
FIG. 8 shows perspectively, a holding bracket of the invention in front and rear views.

For positioning a coil system 2 or a plurality of coil systems 2, or even all coil systems 2, on the measuring tube, a magneto inductive flow measuring device of the invention includes, for example, one or more holding brackets 34. The holding brackets 34 serve for positioning coil systems 2 on the measuring tube. If a supplemental clamping band 35 is used for securing the coil systems 2 on the measuring tube 1, the holding brackets 34 function supplementally only in the assembly phase as holders for the coil systems 2. Here are two holding bracket 34 per coil system used. FIG. 8 shows a holding bracket 34 perspectively in two views. In order to position four coil systems on the measuring tube, e.g. eight holding brackets 34 are utilized, two for each coil system. Nevertheless, these are eight holding brackets 34 of equal construction.

The measuring tube 1 of a magneto inductive, flow measuring device of the invention has especially a size between DN700 and DN2400, especially between DN1350 and DN2400.

In such case, the coils 3 arranged opposite one another on a line are especially so interconnected that their poling in the case of simultaneous excitation is equal on the two oppositely lying end faces 11 of the coils 3 of the two coil systems 2.

If four coil systems are so arranged on the measuring tube that they lie in a plane, in which the longitudinal axis of the measuring tube lies, wherein, in each case, two coil systems are arranged on the measuring tube on different halves of the measuring tube on lines parallel to the longitudinal axis of the measuring tube, then the coils are so interconnected that the coils respectively arranged in a line on a side of the measuring tube have in the case of simultaneous excitation equal poling at the two oppositely lying end faces of the coils, and that the poling in the case of simultaneous excitation at the two oppositely lying end faces the coils on the one half of the measuring tube is opposite to the poling in the case of simultaneous excitation at the two oppositely lying end faces of the coils on the other half of the measuring tube, so that a magnetic field forms in the measuring tube 1 perpendicular to the longitudinal axis 22 of the measuring tube 1. The coil systems are, in such case, equally embodied. Through the application of equal parts, a magneto inductive flow device of the invention is cost effective to manufacture.

Figure 9:
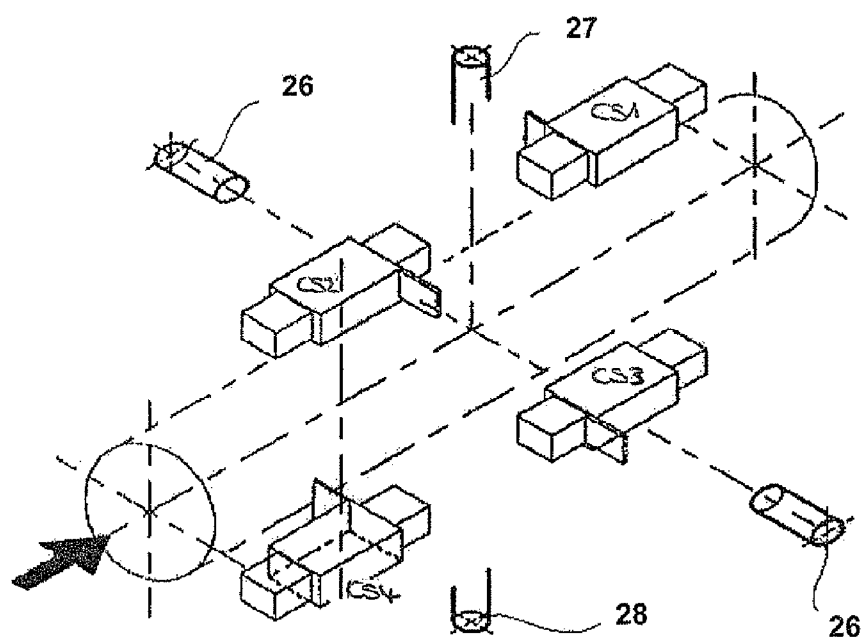
FIG. 9 shows schematically, the arrangement of four coils on the measuring tube.
Figure 10:
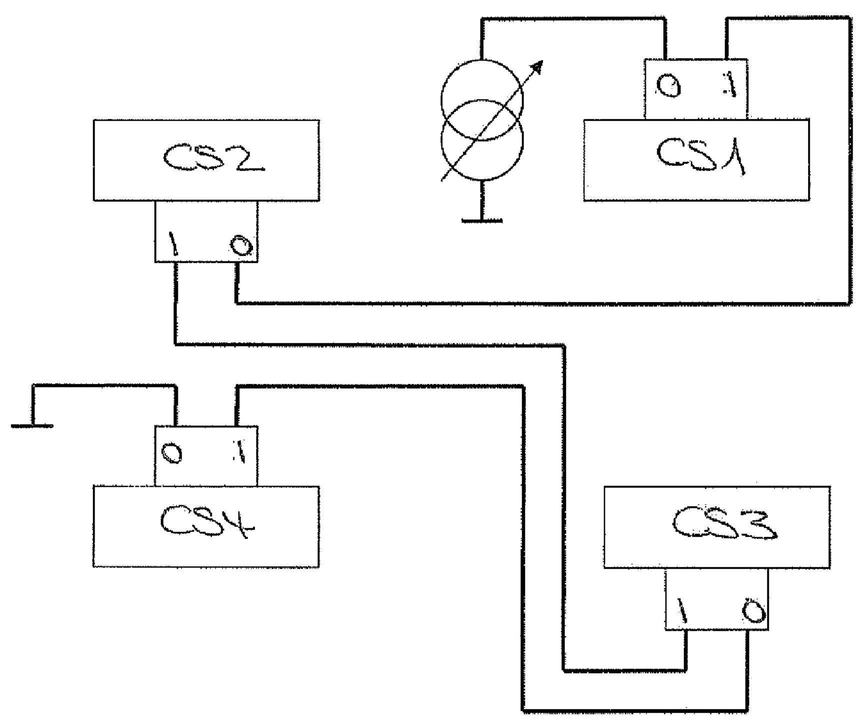
FIG. 10 shows modeling the connecting of the four coils.

FIG. 9 and FIG. 10 show a magneto inductive flow device with the described positions of the coil systems and the connecting of their coils. Since the coils are identical, their positions and connections can also be indicated on the schematically sketched connection tabs for their electrical connection.

The letter I represents, in such case, electrical current into the winding of a coil and the letter O electrical current out of the winding of a coil. CS1, CS2, CS3 and CS4 designate the four coil systems. Besides the two measuring electrodes, two other electrodes are provided in the measuring tube wall. The measuring electrodes lie in a line perpendicular to the measuring tube axis in a plane with this and perpendicular to the plane, which contains the longitudinal axes of the coil systems. The additional electrodes involve, for example, a measured material monitoring electrode and a reference electrode. Both pass through respective bores of the two pole shoes between the coil systems. They lie therewith in a line perpendicular to the measuring tube axis, in the plane of the longitudinal axes of the coil systems. The arrow indicates the flow direction of the flow through the measuring tube.

Figure 2:
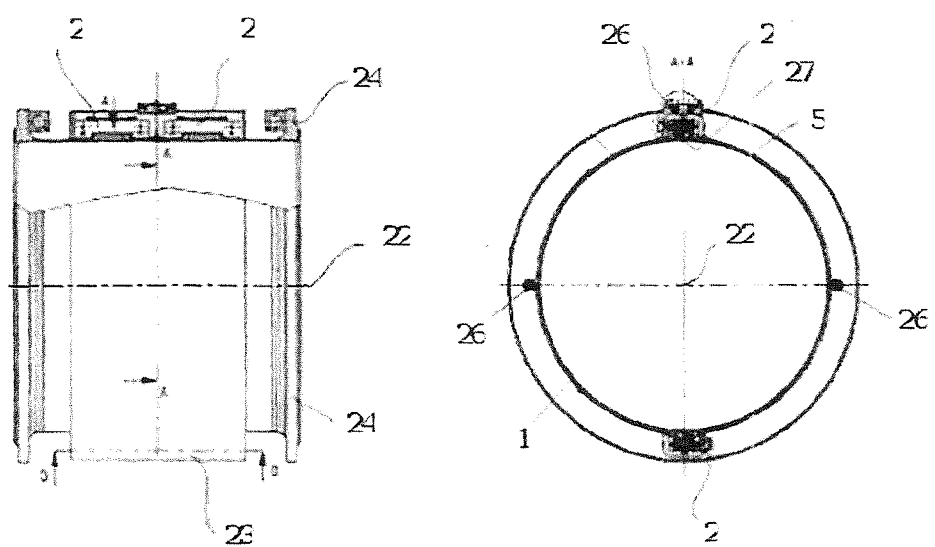
FIG. 2 is a magneto inductive, flow measuring device of the invention in a partial longitudinal section and in cross section.

FIG. 2 shows, in lateral, partial section and in cross section, the magneto inductive, flow measuring device of FIG. 1, which includes a measuring tube 1 and at least one coil system 2 of the invention. The coil systems 2 are, in such case, encapsulated by a surrounding housing 23. Nevertheless, the housing 23 has a low thickness, this being a further advantage of the invention. In an additional further development of the invention, the coil systems 2 have a smaller thickness in the radial direction of the measuring tube 1 than flanges 24 of the measuring tube 1. Only an apparatus 25 for connecting a measurement transmitter can extend beyond. Such an apparatus 25 includes, in such case, also cable guides for contacting the coil systems and the electrodes.

The coil systems 2 are especially so arranged on the measuring tube 1 that the second legs of the core sheets point toward the measuring tube 1. Measuring electrodes 26, a so-called measured material monitoring electrode 27 and a reference electrode 28 extend into the measuring tube 1 of this example.

Figure 3:
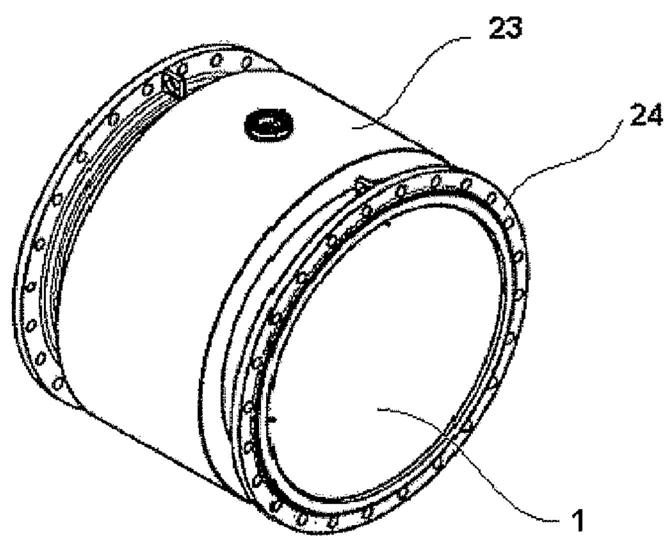
FIG. 3 shows perspectively, the same magneto inductive, flow measuring device of the invention.

Finally, FIG. 3 shows, perspectively, the magneto inductive flow measuring device of FIG. 1 and FIG. 2 with encapsulated coil systems.

LIST OF REFERENCE CHARACTERS

1 measuring tube
2 coil system
3 coil
4 coil core
5 pole shoe
6 first core sheet
7 second core sheet
8 third core sheet
9 first leg
10 second leg
11 first end face
12 second end face
13 bore in a core sheet
14 bolt
15 bolt sleeve
17 nut
18 bellows
19 bore in the bolt sleeve
20 ring of the bolt sleeve
21 region of the bolt sleeve for guiding a bolt
22 measuring tube longitudinal axis
23 housing
24 flange
25 apparatus for connecting a measurement transmitter
26 measuring electrode
27 measured material monitoring electrode
28 reference electrode
29 longitudinal axis of the coil, respectively of the coil system
30 first width of the pole shoe
31 second width of the pole shoe
32 cutouts in the pole shoe
33 bore in the pole shoe
34 holding bracket
35 clamping band
36 connection tabs

The invention claimed is:

1. A magneto inductive flow measuring device, comprising:

a measuring tube; and coil systems arranged thereon, wherein:

each coil system includes a coil and a coil core so led through said coil that said coil core protrudes from said coil; and said coil systems are so arranged on said measuring tube on a line parallel to a longitudinal axis of said measuring tube that a pole shoe is arranged between said measuring tube and said coil cores protruding from said coil systems, wherein said coil cores of said coil systems comprise at least three core sheets, and wherein each core sheet has a first leg and a second leg, which are connected together to form an L shape;

at least a first core sheet and a second core sheet and a third core sheet are so led through said coil that the first leg of said first core sheet and the first leg of said second core sheet and the first leg of said third core sheet extend parallel to one another through said coil and that the second leg of said first core sheet and the second leg of said second core sheet and the second leg of said third core sheet extend parallel to one another;

the second leg of said first core sheet and the second leg of said third core sheet are arranged at a first end of said coil and the second leg of said second core sheet is arranged at a second end of said coil facing away from the first end;

said second core sheet is arranged between said first core sheet and said third core sheet; and said pole shoe is arranged between said measuring tube and the second legs of said first core sheet and said third core sheet.

2. The magneto inductive flow measuring device as claimed in claim 1, wherein:

said coil cores of said coil systems contact said pole shoe.

3. The magneto inductive flow measuring device as claimed in claim 1, wherein:

said coil cores of said coil systems, in each case, extend out from said coil on both ends of said coil; and said coil cores are U shaped and so arranged on said measuring tube that an opening of the U points toward said measuring tube.

4. The magneto inductive flow measuring device as claimed in claim 1, wherein:

said coil cores of said coil systems comprise stacks each with a plurality of core sheets.

5. The magneto inductive flow measuring device as claimed in claim 1, wherein:

said core sheets have equal shape and size.

6. The magneto inductive flow measuring device as claimed in claim 1, wherein:

said pole shoe has parallel to the longitudinal axis of said measuring tube a first width, which is less than or equal to a separation of two oppositely lying end faces of said coils of said two coil systems.

7. The magneto inductive flow measuring device as claimed in claim 6, wherein:

said pole shoe has parallel to the longitudinal axis of said measuring tube a second width, which is greater than the separation of two oppositely lying end faces of said coils of said two coil systems.

8. The magneto inductive flow measuring device as claimed in claim 6, wherein:

said pole shoe partially surrounds said measuring tube;

said pole shoe has the first width lessened in the region of said coil system coupled with the otherwise greater second width parallel to a longitudinal axis of said measuring tube.

9. The magneto inductive flow measuring device as claimed in claim 1, wherein:

said coils of said coil systems are so arranged on a line and interconnected that their poling in the case of simultaneous excitation is equal at two oppositely lying end faces of said coils of said two coil systems.

10. The magneto inductive flow measuring device as claimed in claims 1, wherein:

four coil systems are so arranged on said measuring tube that they lie in a plane, in which the longitudinal axis of said measuring tube lies; and respective two coil systems are arranged on different halves of said measuring tube.

* * * * *